(12) United States Patent
Motouji et al.

(10) Patent No.: US 6,537,347 B2
(45) Date of Patent: Mar. 25, 2003

(54) METHOD FOR DECIDING ON THE TIMING OF REPLACING A CHEMICAL FILTER, FILTER LIFE DETECTION SENSOR, CHEMICAL FILTER UNIT, AND SEMICONDUCTOR MANUFACTURING APPARATUS

(75) Inventors: Satoshi Motouji, Kyoto (JP); Iichi Hirao, Kyoto (JP); Teruyuki Hayashi, Nirasaki (JP); Misako Saito, Nirasaki (JP)

(73) Assignees: Omron Corporation, Kyoto (JP); Tokyo Electron LTD, Tokyo (JP)

( * ) Notice: Subject to any disclaimer, the term of this patent is extended or adjusted under 35 U.S.C. 154(b) by 0 days.

(21) Appl. No.: 10/053,880

(22) Filed: Jan. 24, 2002

(65) Prior Publication Data

US 2002/0112605 A1 Aug. 22, 2002

(30) Foreign Application Priority Data

Jan. 26, 2001 (JP) ......................... 2001-18953

(51) Int. Cl.⁷ ..................... B01D 53/04; G01R 27/00
(52) U.S. Cl. ..................... 95/8; 95/901; 96/111; 96/417; 73/31.03; 422/82.02
(58) Field of Search ............ 95/1, 8, 90, 273, 95/901; 96/108, 109, 111, 115, 116, 417; 73/19.12, 31.03, 31.05, 31.07; 422/82.01, 82.02, 88, 98

(56) References Cited

U.S. PATENT DOCUMENTS

| | | | | |
|---|---|---|---|---|
| 2,951,156 A | * | 8/1960 | Miller | 250/306 |
| 4,472,356 A | * | 9/1984 | Kolesar, Jr. | 422/88 |
| 5,120,511 A | * | 6/1992 | Luft | 422/86 |
| 5,151,251 A | * | 9/1992 | Solcia et al. | 422/119 |
| 5,172,066 A | * | 12/1992 | Succi et al. | 324/693 |
| 5,294,407 A | * | 3/1994 | Succi et al. | 422/119 |
| 5,334,237 A | * | 8/1994 | Lorimer | 95/25 |
| 5,512,882 A | * | 4/1996 | Stetter et al. | 340/632 |
| 6,162,281 A | * | 12/2000 | Ammann et al. | 95/8 |
| 6,168,645 B1 | * | 1/2001 | Succi et al. | 95/8 |

FOREIGN PATENT DOCUMENTS

JP    60-147213 A   *   8/1985

* cited by examiner

*Primary Examiner*—David A. Simmons
*Assistant Examiner*—Frank M. Lawrence
(74) *Attorney, Agent, or Firm*—Foley & Lardner (57) ABSTRACT

A chemical filter unit 10 is made of a chemical filter 12 and a filter life detection sensor 1. The filter life detection sensor 1 is provided with an adsorption state detection sensor 3 and a reference sensor 4 to which a flow of air is blocked. The sensors 3 and 4 are made of the same filter material as the chemical filter 12 with a pair of electrodes sandwiching the filter material. An oscillation circuit, in which the sensors 3 and 4 constitute a part of the oscillating conditions, detects changes in impedance of the sensors 3 and 4 based on the changes in oscillation frequencies. A measurement of the adsorption state detection sensor 3 is corrected with a measurement of the reference sensor 4 in order to remove effects of temperature and humidity, obtain a measurement corresponding to the amount of adsorption of chemical substances, and decide on the timing of replacing the chemical filter based on the corrected measurement.

8 Claims, 8 Drawing Sheets

DIRECTION OF AN AIR FLOW

DIRECTION OF AN AIR FLOW

DIRECTION OF AN AIR FLOW

FIG.9

DIRECTION OF AN AIR FLOW

METHOD FOR DECIDING ON THE TIMING OF REPLACING A CHEMICAL FILTER, FILTER LIFE DETECTION SENSOR, CHEMICAL FILTER UNIT, AND SEMICONDUCTOR MANUFACTURING APPARATUS

CROSS-REFERENCES TO RELATED APPLICATION

This application claims all benefits accruing 35 U.S.C. 119 from the Japanese Patent Application No. 2001-18953, filed on Jan. 26, 2001.

BACKGROUND OF THE INVENTION

1. Field of the Invention

The present invention relates to a method for deciding on the timing of replacing a chemical filter for cleaning air used for clean rooms, semiconductor manufacturing apparatuses, etc.; a filer life detection sensor for detecting the timing of replacing the chemical filter; a chemical filter unit provided with a filter life detection sensor; and a semiconductor manufacturing apparatus provided with the chemical filter unit.

2. Description of the Related Art

In recent years, as the degree of integration of semiconductor devices increases, a problem of chemical contamination inside clean rooms or semiconductor manufacturing apparatus chambers has arisen. In order to cope with the chemical contamination, chemical filters of an activated charcoal fiber type or an ion-exchange type, which are capable of removing gaseous contaminants (chemical substances), are widely used.

Conventionally, the life of such chemical filters (replacement timing) would be determined as follows.

(1) Measure amounts of adsorbed chemical substances which were contained in the air in front and at the back of the chemical filter, respectively, take the difference between the two measurements, and use the difference in assessing the change of adsorption capability for chemical substances (the change of the state of activation) of the chemical filter. If the difference in the amounts of adsorbed chemical substances between in front and at the back of the chemical filter reaches a predetermined value or less, then it would be interpreted as a sign indicating an end of filter's life and the filter would be replaced.

(2) Remove the chemical filter and measure its weight. If the increase in weight reaches a predetermined value and beyond, then it would be interpreted as a sign indicating an end of filter's life and the filter would be replaced.

However, since these conventional method for determining filter's life does not allow continuous monitoring for filter's condition and, therefore, the timing of replacing the filter cannot appropriately be determined, it would be quite possible for the filter to be used beyond the end of its life.

The present invention was made to resolve this problem, and its objectives are to provide a method for deciding on the timing of replacing a chemical filter, a filter life detection sensor, a chemical filter unit, and a semiconductor manufacturing apparatus, where an adsorption state of chemical substances can continuously be monitored while the filter is in service, thereby making it possible to replace the filter without missing the end of its life.

SUMMARY OF THE INVENTION

In order to resolve the above-mentioned problem, a method for deciding on the timing of replacing a chemical filter placed in a ventilation path for removing contaminants from air according to the present invention includes: providing sensors constituted of the same material as the chemical filter; and taking a measurement of an impedance of the material as the chemical filter; where: an adsorption state detection sensor through which air containing contaminants flows and a reference sensor to which a flow of air is blocked serve as the sensors; the measurement of the impedance of the material constituting the adsorption state detection sensor is corrected with the measurement of the impedance of the material constituting the reference sensor, thereby obtaining a corrected measurement; and the timing of replacing the chemical filter is decided based upon the corrected measurement.

The impedance of the material of the chemical filter varies with parameters such as temperature and humidity as well as the amount of adsorbed contaminants. If the change in impedance due to factors other than the amount of adsorbed contaminants can be detected based on results obtained by the reference sensor and the measurement by the adsorption state detection sensor is corrected, then the amount of adsorbed contaminants can be obtained with great accuracy, and the timing of replacing the chemical filter can accurately be determined.

Incidentally, the impedance can be measured by using an oscillation circuit including the sensor as a part of the oscillating conditions, where the measurement is taken based on an oscillation frequency or an oscillation amplitude thereof.

By having the above-mentioned construction, changes in impedance can precisely be detected, and the timing of replacing the chemical filter can accurately be determined.

A filter life detection sensor according to the present invention is constituted of the same material as a chemical filter placed in a ventilation path for removing contaminants from air and includes: an adsorption state detection sensor through which air containing contaminants flows; and a reference sensor to which a flow of air is blocked.

Since the filter life detection sensor according to the present invention is constituted of the same material as the chemical filter placed in the ventilation path, the timing of replacing the chemical filter can be determined by taking a measurement of an impedance of the adsorption state detection sensor. Furthermore, if changes in impedance due to factors other than the amount of adsorption of contaminants is detected by the reference sensor and the measurement taken by the adsorption state detection sensor is corrected accordingly, then the amount of adsorption of contaminants can be obtained with great accuracy. This makes it possible to accurately decide on the timing of replacing the chemical filter.

Furthermore, since a filter life detection sensor according to the present invention includes an air cleaning reference sensor or an adsorption state detection sensor in front of a reference sensor, by taking a deviation of an impedance of the reference sensor from an impedance of the adsorption state detection sensor, a chemical filter's life can be detected without being affected by not only temperature and humidity but also the air passing therethrough.

Since a chemical filter unit according to the present invention include a chemical filter and sensors, the chemical filter's life can individually be decided independent of other chemical filter units. Furthermore, even in the case of a plurality of stages of chemical filter units, the chemical filter's life can individually be decided independent of other chemical filter units.

By providing the chemical filter unit according to the present invention in a ventilation path of a semiconductor manufacturing apparatus, the adsorption state of chemical substances can continuously be monitored while the semiconductor manufacturing apparatus is still in service, and the timing of replacing the chemical filter can accurately be decided.

Incidentally, a chemical filter used in the present invention may be of an activated charcoal fiber type, which is expected to improve the capability of the filter to adsorb chemical substances passing therethrough.

BRIEF DESCRIPTION OF THE DRAWINGS

The invention disclosed herein will be understood better with reference to the accompanying drawings of which.

DETAILED DESCRIPTION OF THE PREFERRED EMBODIMENTS

Figure 1:
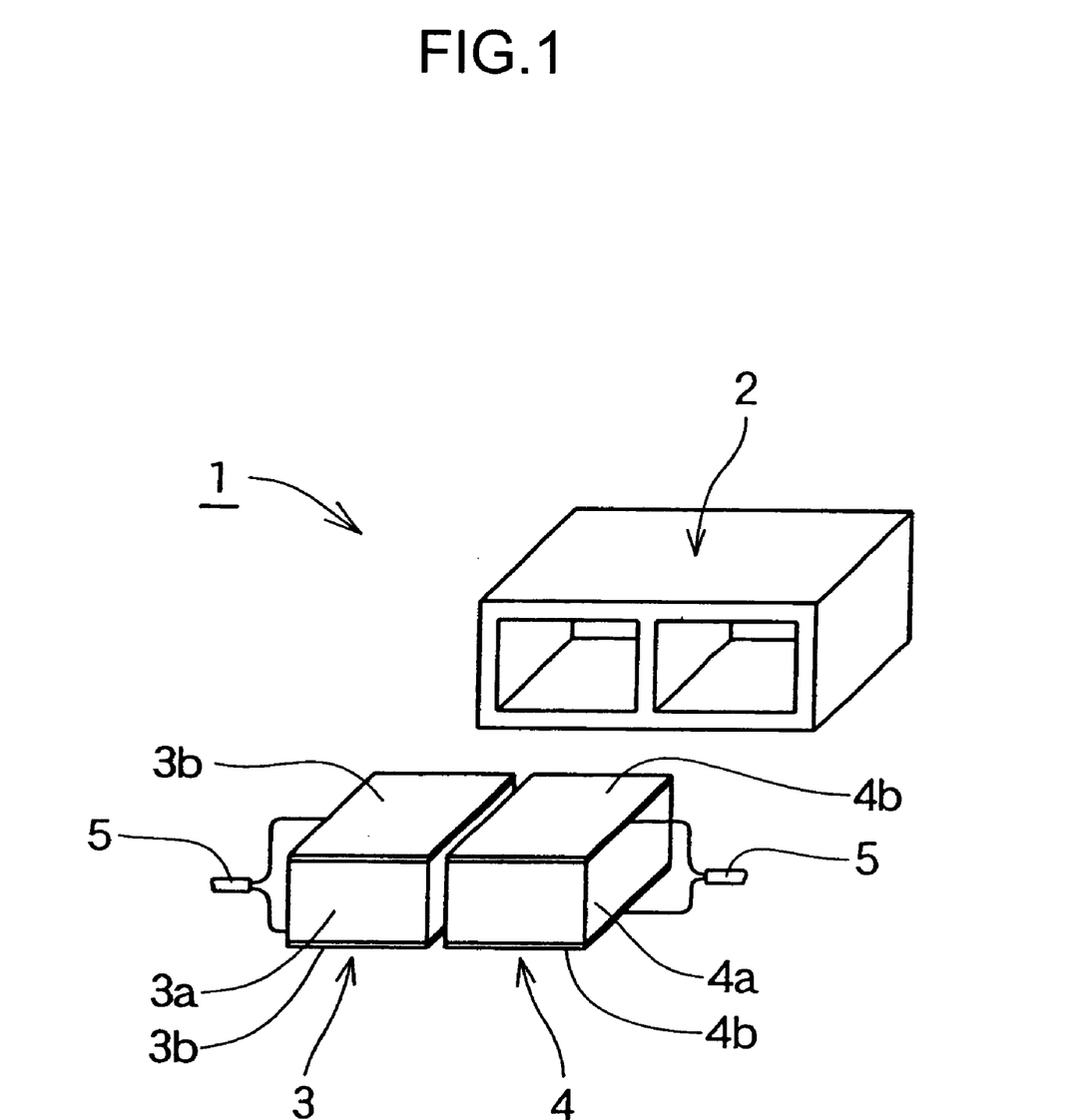
FIG. 1 is an exploded view in perspective of a filter life detection sensor (a sensor unit) in Example 1 according to the present invention.

Hereinafter, the present invention will be described in further detail with reference to the accompanying drawings. FIG. 1 is an exploded view in perspective of a filter life detection sensor (a sensor unit) in Example 1 according to the present invention. The filter life detection sensor (the sensor unit) 1 according to the present invention is made of a adsorption state detection sensor 3 and a reference sensor 4, which are incased in a sensor case 2. Reference numeral 5 indicates shielded cables. The reference sensor 4 is provided with an air blocking board (not shown in the figure) which blocks the flow of air into the reference sensor 4.

Incidentally, the air blocking board can be provided both in front and at the back of the reference sensor 4. The air blocking board can be provided for the sensor case 2 to block the flow of air into the reference sensor 4.

The sensor case 2 is made of materials such as polytetrafluoroethylene (Teflon) in order to prevent contaminants from being produced. The sensors 3 and 4 are made of the same filter material 3a and 4a of an activated charcoal fiber type as the chemical filter, respectively, the material 3a being sandwiched with conductive electrodes 3b and the material 4a with conductive electrodes 4b. The conductive electrodes 3b and 4b are oriented parallel to the flow of air. The filter materials 3a and 4a and the electrodes 3b and 4b, respectively, can be glued together with conductive glue, or they can simply be placed together in electrical contact. The ends of the shielded cables 5 are connected to the electrodes 3b and 4b.

Incidentally, the sensors 3 and 4 can be constructed in such a manner that the sensor case 2 is provided with the electrodes, which make electrical contacts with the filter materials 3a and 4a when they are placed into the sensor case 2.

Furthermore, there is no need that the sensor case 2 be always provided. If the construction of the sensors is such that electrical insulation between the electrodes of sensors and the chemical filter is properly maintained, an example being the insertion of an insulation sheet therebetween, then the sensors can directly be placed in the chemical filter.

Figure 2:
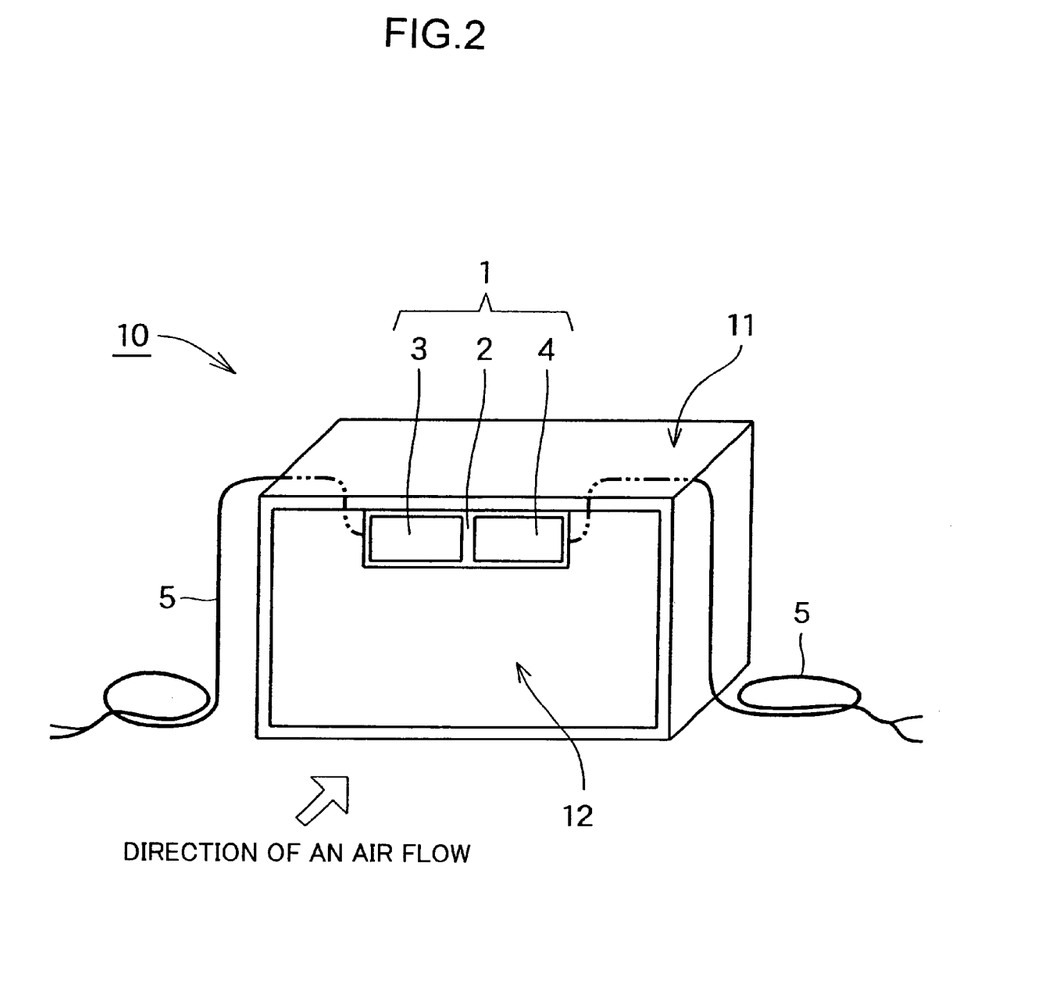
FIG. 2 is a perspective view of a chemical filter unit according to the present invention.

FIG. 2 is a perspective view of a chemical filter unit according to the present invention. The chemical filter unit 10 according to the present invention is made of a chemical filter (a filter body) 12 and a filter life detection sensor (a sensor unit) 1, which are incased in a filter unit case 11.

As shown in FIG. 2, the filter life detection sensor (the sensor unit) 1 is incorporated into the chemical filter (the filter body) 12 and, while functioning as a part of the filter for removing chemical substances, monitors the adsorption state of chemical substances within the chemical filter (the filter body) 12. As described here, the adsorption state detection sensor 3 of the filter life detection sensor (the sensor unit) 1, as being incorporated into the chemical filter unit 10, goes on adsorbing chemical substances as the chemical filter (the filter body) 12 does. Therefore, by detecting the adsorption state of chemical substances by the filter life detection sensor (the sensor unit) 1, the adsorption state (activation state) of the chemical filter (the filter body) 12 can be detected, and the timing of replacing the chemical filter (the filter body) 12 can be decided.

Figure 3:
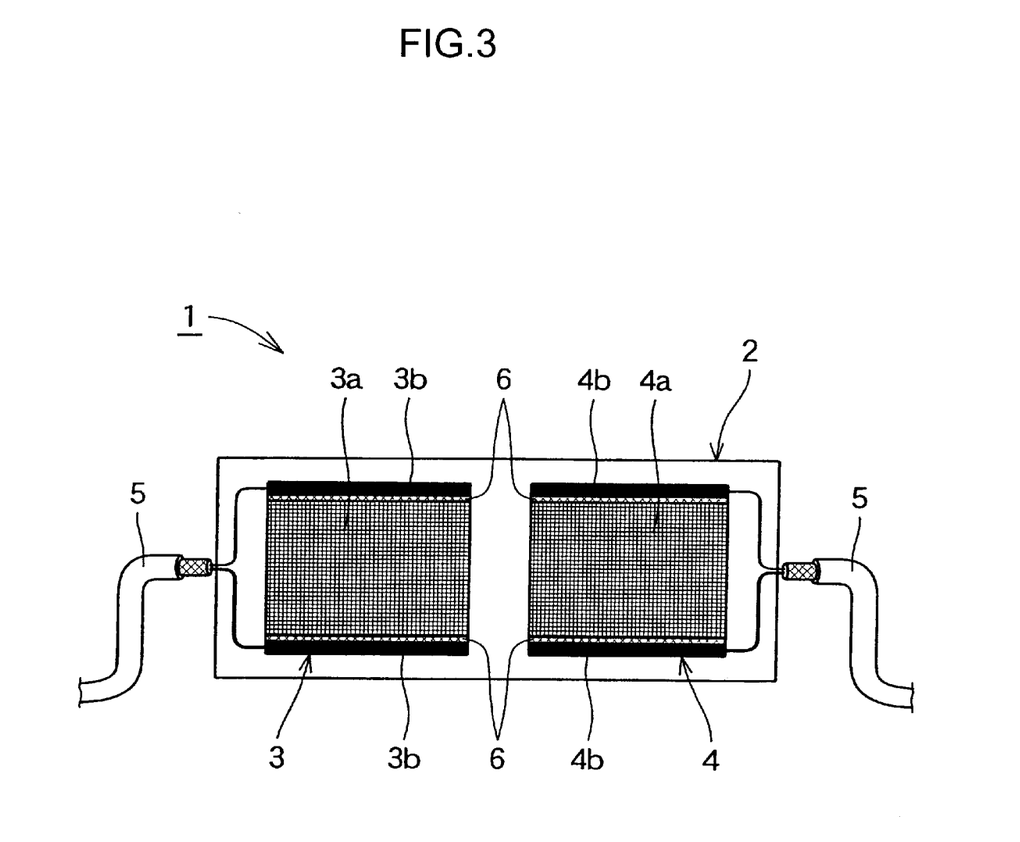
FIG. 3 is a longitudinal cross-sectional view of the filter life detection sensor (the sensor unit) illustrated in FIG. 1.

FIG. 3 is a longitudinal cross-sectional view of the filter life detection sensor (the sensor unit) illustrated in FIG. 1. The adsorption state detection sensor 3 and the reference sensor 4 are arranged in parallel inside the sensor case 2. In FIG. 3, the filter materials 3a and 4a and the electrodes 3b and 4b of the sensors 3 and 4, respectively, are glued to each other with conductive glue 6.

Although the reference sensor 4 has the same structure as the adsorption state detection sensor 3, the reference sensor 4 slightly differs in that it is provided with an air blocking board (not shown in the figure) in front. This air blocking board blocks the flow of air into the filter material 4a and, consequently, prevents the adsorption of chemical substances there. Therefore, the reference sensor 4 can be made sensitive only to the effects due to factors such as temperature and humidity but the adsorption of chemical substances.

By correcting detected values from the adsorption state detection sensor 3 with detected values from the reference sensor 4, effects due to factors other than the adsorption of chemical substances can be removed, and the adsorption state of chemical substances can be detected with great accuracy.

Figure 4:
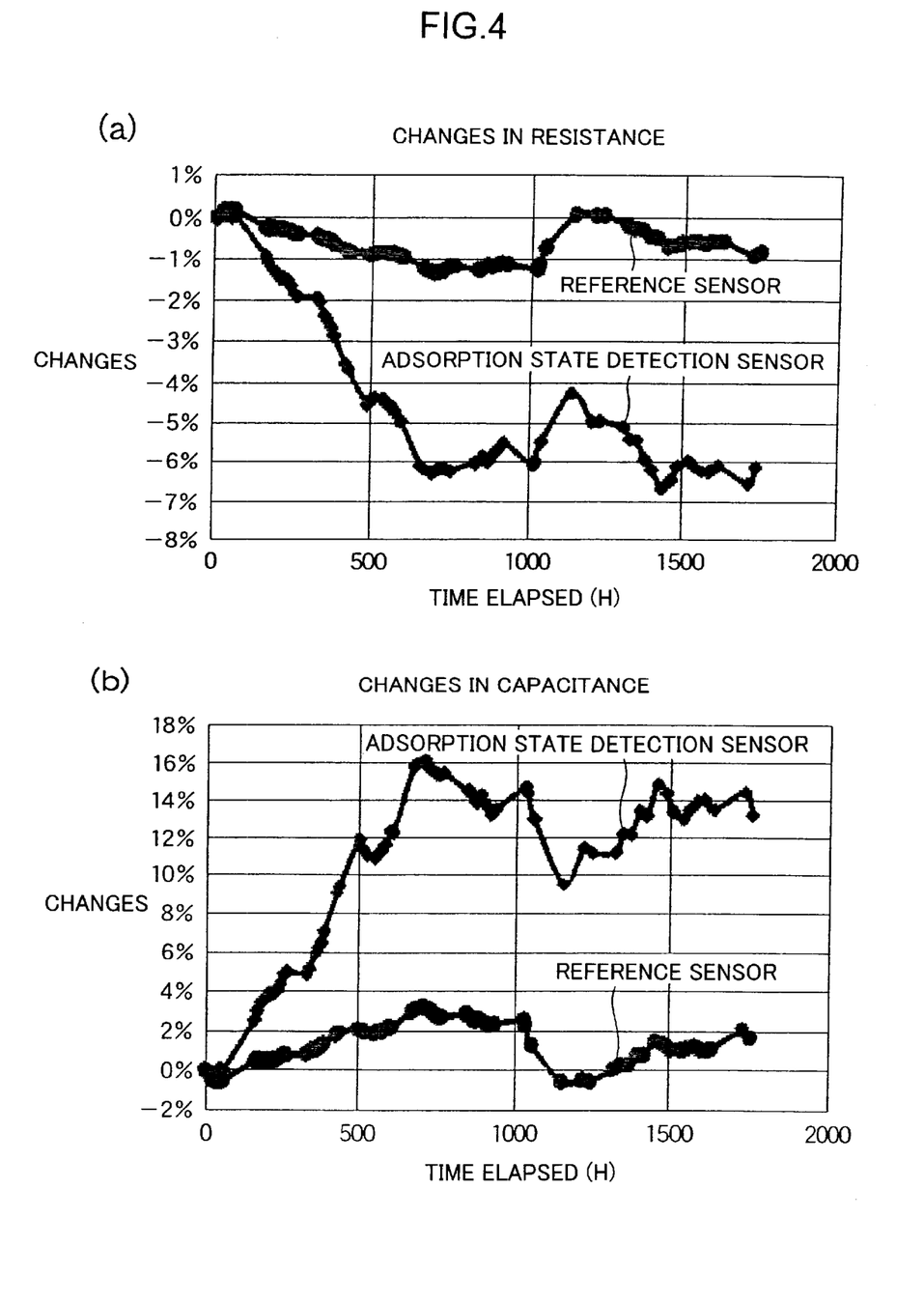
FIGS. 4(a) and 4(b) are graphs of data indicating the changes in impedance between the electrodes of the sensors while air is guided through the chamber.

FIGS. 4(a) and 4(b) are graphs of data indicating the changes in impedance between the electrodes of sensors while air is guided through chambers. FIG. 4(a) shows changes of the real part of impedance for each sensors (value of resistance), and FIG. 4(b) shows changes of the imaginary part of impedance for each sensors (value of capacitance).

From these figures, it can be seen that the impedance of the reference sensor 4 stays constant regardless of the duration of air flow, but the impedance of the adsorption state detection sensor 3 varies with time as air flow continues and, beyond a certain point on a time scale, it reaches a saturation point.

Figure 5:
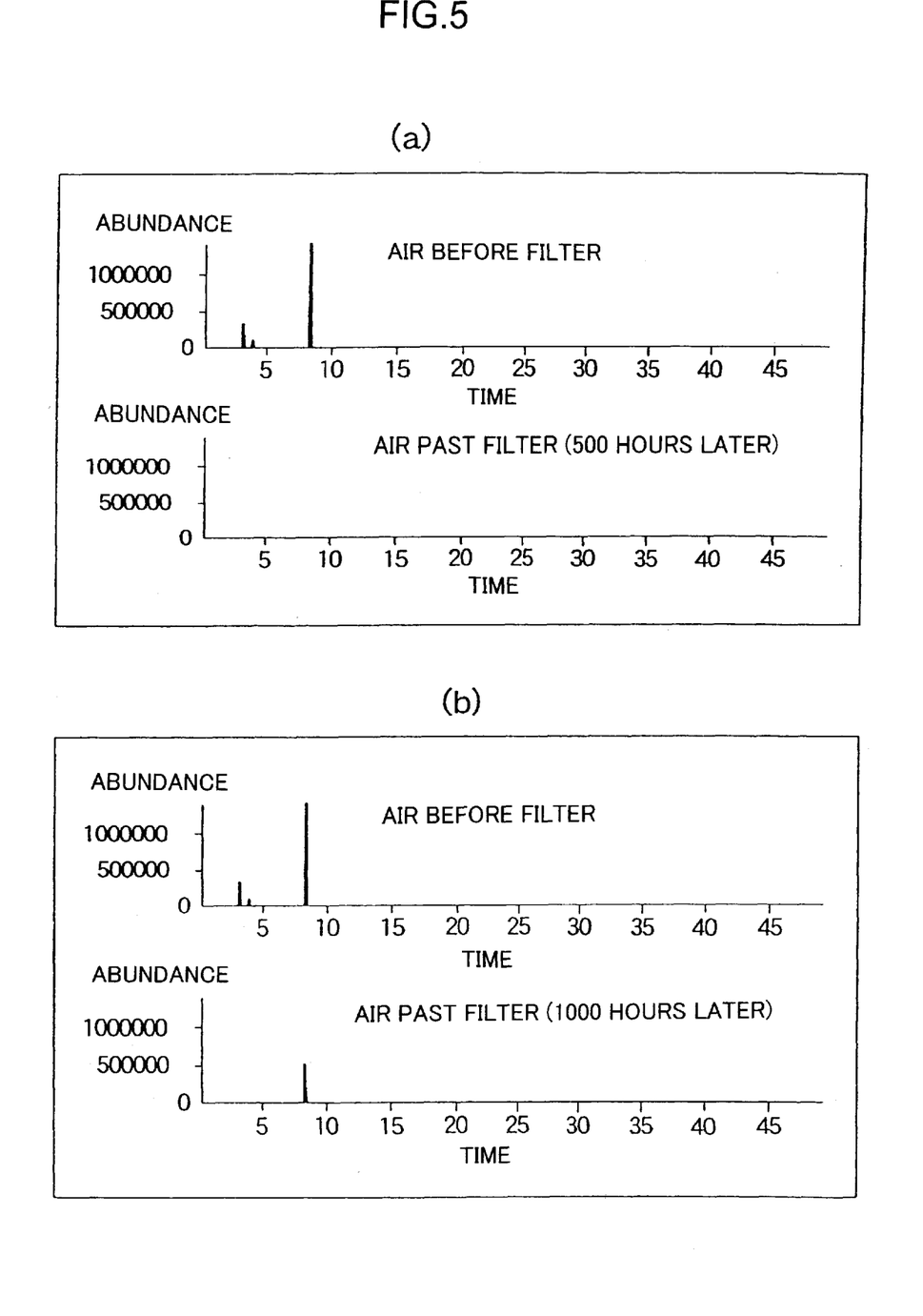
FIGS. 5(a) and 5(b) are graphs of data indicating the results of measurement of the amount of chemical substances contained in the air in front and at the back of the filter.

FIGS. 5(a) and 5(b) are graphs of data indicating the results of measurement of the amount of chemical substances contained in the air in front and at the back of the filter. FIG. 5(a) shows the results of measurement taken when 500 hours have elapsed since air started flowing through the chamber. From FIG. 5(a), it can be seen that chemical substances present in front (at the upstream) of the filter are not detected in the back (at the downstream) of the filter, indicating the fact that the chemical substances have been adsorbed by the filter.

FIG. 5(b) shows the data taken when 1,000 hours have elapsed. From FIG. 5(b), it can be seen that a part of chemical substances present in front (at the upstream) of the filter are not removed and are still present at the back (at the downstream) of the filter. This indicates the fact that the chemical substances have passed through the filter without being adsorbed due to the contamination of the filter, that is, the filter life has ended.

Furthermore, from FIGS. 4(a) and 4(b) and FIGS. 5(a) and 5(b), it can be seen that there is a certain correlation between the filter life and the saturation of changes in impedance. Therefore, by detecting the changes in impedance of the filter, the adsorption state of chemical substances can be monitored, and the detection of filter life becomes possible.

As described above, the present invention closely watches the changes in impedance between the electrodes due to the adsorption of chemical substances in order to monitor the adsorption state of chemical substances and detect the filter life (activation state).

Figure 6:
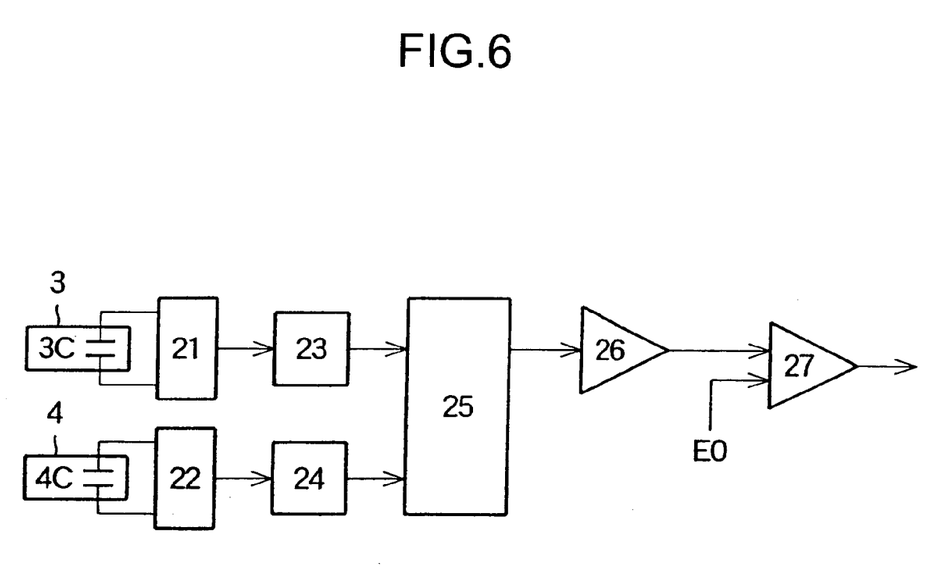
FIG. 6 is a block diagram of a signal processing circuit for deciding on the timing of replacing the filter.

FIG. 6 is a block diagram of a signal processing circuit for deciding on the timing of replacing the filter. The signal processing circuit shown in FIG. 6 includes oscillation circuits 21 and 22, where the sensors 3 and 4, respectively, constitute a part of the oscillating condition, and converts changes in the capacitance of the sensors 3 and 4 into changes in oscillation frequencies. Oscillation frequency signals from the oscillation circuits 21 and 22 are wave-shaped in wave-shaping circuits 23 and 24, respectively, and then, supplied to an F-V (frequency-voltage) conversion circuit 25. The F-V (frequency-voltage) conversion circuit 25 converts a difference in oscillation frequencies with reference to an oscillation frequency of the reference sensor 4 into a difference in voltage and outputs the difference. The voltage signal outputted from the F-V (frequency-voltage) conversion circuit 25 is amplified by an amplifying circuit 26 with offset adjustment capabilities and supplied to one of the two input terminals of a comparing circuit 27. Other input terminal of the comparing circuit 27 receives a threshold voltage E0 for determining the filter life.

When the filter is put into service, as the filter material adsorbs chemical substances, an impedance (to be understood as "capacitance" here) of the filter material changes. These changes in impedance (to be understood as "capacitance" here) are detected as changes in oscillation frequencies and converted into changes in voltage by the F-V (frequency-voltage) conversion circuit 25. If this voltage reaches the predetermined threshold voltage E0 for determining the filter life, then the comparing circuit 27 generates an output which indicates that the filter life has ended. Incidentally, the threshold voltage for determining the filter life E0 is set in such a manner that the output is generated before the chemical filter reaches the breakpoint (where the filter loses the adsorption capability). If the output from the comparing circuit 27 is sent out to a component not shown in the figure such as a display apparatus, the timing of replacing the filter can be perceived by an operator through visual or audible representation.

Although the signal processing circuit in FIG. 6 is shown as the one which is constituted mainly of analog circuits, the same effect can be obtained by a circuit arrangement, in which the oscillation frequencies of the oscillation circuit are converted into a voltage by the F-V conversion circuit and, then, the voltage is converted into voltage data by an A/D converter at specified time intervals and sent out to a micro-computer system. Then, the micro-computer system stores in time series the sampled voltage data in a memory device such as a non-volatile memory, analyzes changes in impedance characteristics of the filter material, and generates a signal which indicates that the filter life has ended (a filter replacement timing determination signal) before it reaches the breakpoint. There may be provided only one oscillation circuit, in which case the sensor to be connected to the oscillation circuit, either the adsorption state detection sensor 3 or the reference sensor 4, is switched at specified time intervals in order to detect changes in impedance of these sensors.

Figure 7:
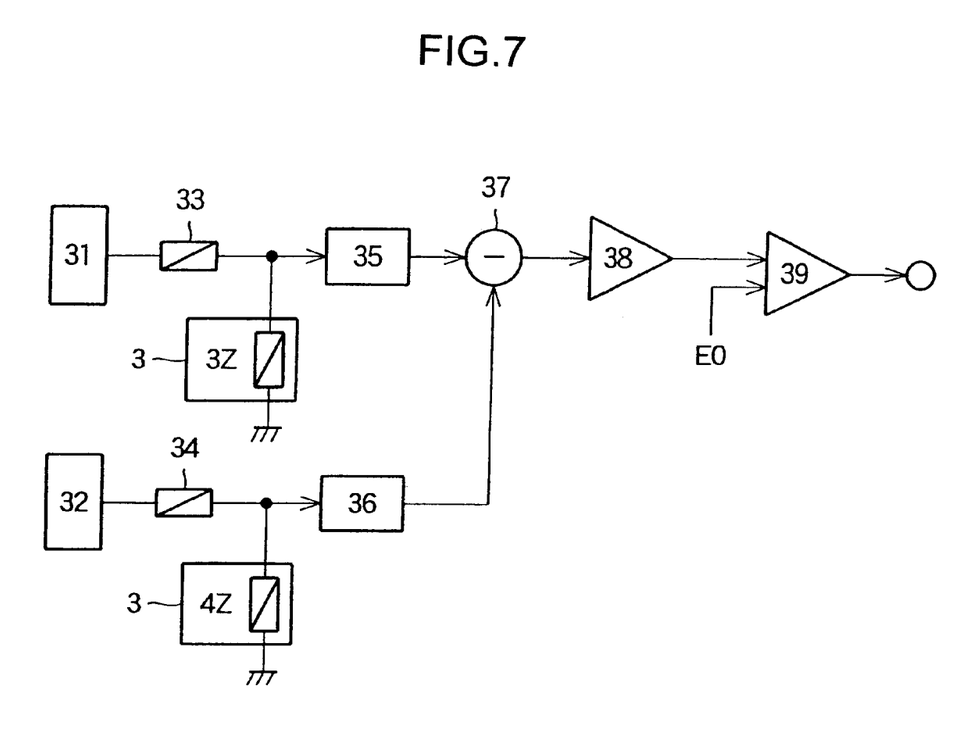
FIG. 7 is a block diagram of another signal processing circuit for deciding on the timing of replacing the filter.

FIG. 7 is a block diagram of another signal processing circuit for deciding on the timing of replacing the filter. The signal processing circuit shown in FIG. 7 is designed to detect changes in impedance of the sensors 3 and 4 as changes in voltage. Specifically, oscillating circuits 31 and 32, which generate high frequency signals of a specified frequency and a specified voltage, send output signals to impedance components 33 and 34 of known reference impedance, respectively, thereby detecting impedance between electrodes 3Z and 4Z.

Output signals from the oscillating circuits 31 and 32 whose voltages have been divided in accordance with the reference impedance 33 and 34 and the impedance between electrodes 3Z and 4Z of the sensors 3 and 4, respectively, are supplied to a subtracting circuit (a differential amplifying circuit) 37 via offset-gain adjusting circuits 35 and 36, respectively. The subtracting circuit 37 subtracts the voltage corresponding to the impedance of the reference sensor 4 from the voltage corresponding to the impedance of the adsorption state detection sensor 3 and generates output voltage signals corresponding to the amount of adsorption of chemical substances, from which effects due to factors such as temperature and humidity have been removed. These voltage signals are amplified by an amplifying circuit 38 and compared with the threshold voltage for determining the filter life by a comparing circuit 39. Operation of the comparing circuit 39 is the same as that of the comparing circuit 27 shown in FIG. 6. If the output from the comparing circuit 39 is sent out to a component not shown in the figure such as a display apparatus, the timing of replacing the filter can be perceived by an operator through visual or audible representation.

Figure 8:
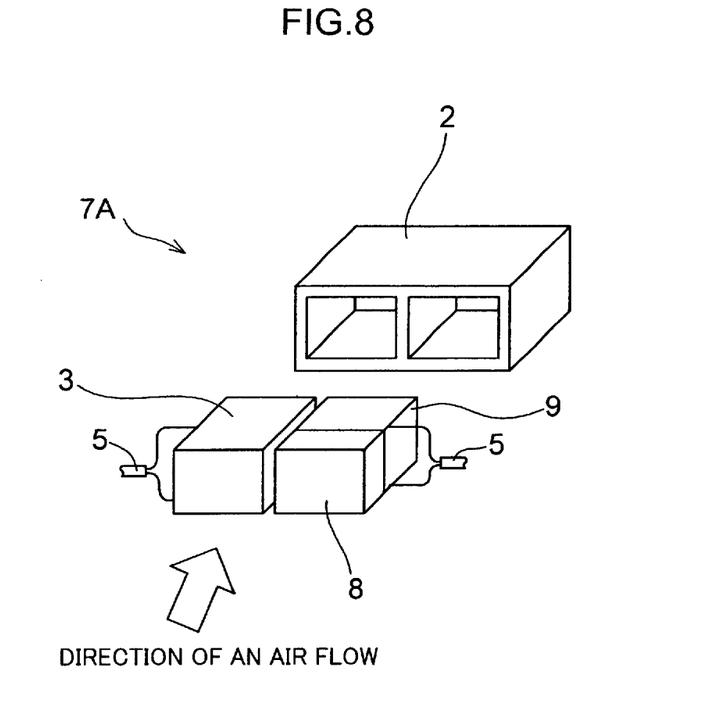
FIG. 8 is an exploded view in perspective of a filter life detection sensor (a sensor unit) in Example 2 according to the present invention.

FIG. 8 is an exploded view in perspective of a filter life detection sensor (a sensor unit) in Example 2 according to the present invention. A filter life detection sensor (a sensor unit) 7A in FIG. 8 differs from the sensor unit 1 shown in FIG. 1 in that an air cleaning reference 8 is provided in front of a reference sensor 9.

The reference sensor 9 is not provided with the air blocking board and receives air which has gone through the air cleaning reference filter 8. This air is clean since chemical substances and contaminants which were contained in the air have been adsorbed by the air cleaning reference filter 8. Therefore, the reference sensor 9, which experiences no changes in impedance due to chemical substances, functions as a reference with which fluctuations in impedance due to not only temperature and humidity but also the air passing through the filter can be corrected.

When the life of the chemical filter 12 ends, then the impedance of the adsorption state detection sensor 3 reaches saturation. Since, at the same time, the air cleaning reference filter 8 reaches its saturation and lose cleaning capabilities, the air containing chemical substances reaches to and goes through the reference sensor 9, thereby changing the impedance of the reference sensor 9.

By determining the deviation of the impedance of the adsorption state detection sensor 3 from that of the reference sensor 9, the life of the chemical filter can be detected without the influence of not only temperature and humidity but also the air passing therethrough.

Figure 9:
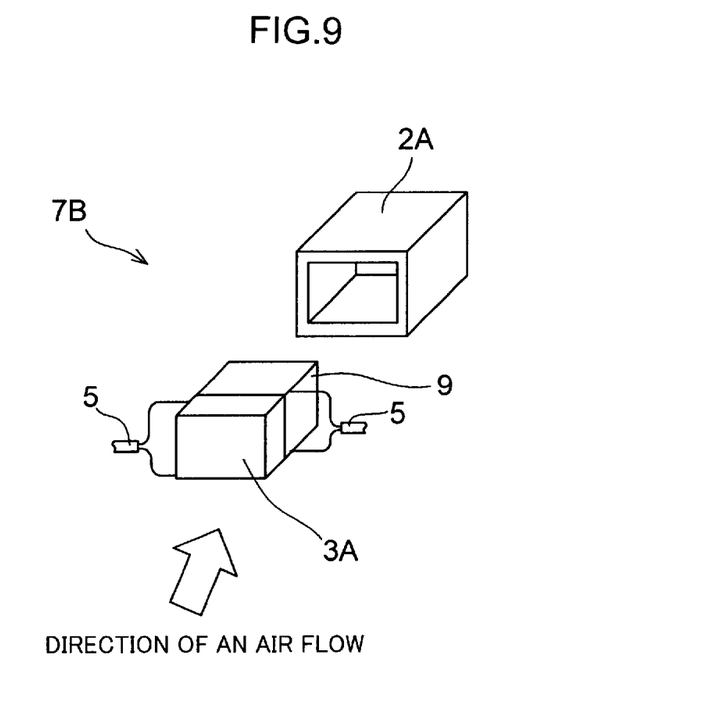
FIG. 9 is an exploded view in perspective of a filter life detection sensor (a sensor unit) in Example 3 according to the present invention.

FIG. 9 is an exploded view in perspective of a filter life detection sensor (a sensor unit) in Example 3 according to the present invention. The filter life detection sensor (the sensor unit) 7B shown in FIG. 9, instead of being provided with the air cleaning reference filter 8 of FIG. 8, is provided with an adsorption state detection sensor 3A and incased in a sensor case 2A. This leads to the miniaturization of the sensor case 2A and to the miniaturization and weight reduction of the sensor unit 7B.

As in the case of the sensor unit 7A shown in FIG. 8, the filter life detection sensor (the sensor unit) 7B can detect the life of the chemical filter without the influence of not only temperature and humidity but also the air passing therethrough by determining the deviation of the impedance of the adsorption state detection sensor 3A from that of the reference sensor 9.

By applying the present invention, namely, the method for deciding on the timing of replacing a chemical filter, a filter life detection sensor, and a chemical filter unit, to semiconductor manufacturing apparatuses, clean rooms, etc., chemical filters can properly be replaced, thereby certainly avoiding chemical contamination inside a chamber of semiconductor manufacturing apparatus or a clean room.

As described above, by using the present invention, the adsorption state of chemical substances of a chemical filter can be monitored without periodically conducting off-line inspections, and the filter can timely be replaced before its service life ends.

As many apparently widely different embodiments of this invention may be made without departing from the spirit and scope thereof, it is to be understood that the invention is not limited to the specific embodiments thereof except as defined in the appended claims.

What is claimed is:

1. A method for deciding on timing of replacing a chemical filter placed in a ventilation path for removing contaminants from air, comprising:

providing sensors constituted of a same material as said chemical filter; and taking a measurement of an impedance of said material constituting said sensors, wherein:

an adsorption state detection sensor through which air containing contaminants flows and a reference sensor to which a flow of air is blocked serve as said sensors;

said measurement of said impedance of said material constituting said adsorption state detection sensor is corrected with said measurement of said impedance of said material constituting said reference sensor, thereby obtaining a corrected measurement; and said timing of replacing said chemical filter is decided based upon said corrected measurement.

2. A method for deciding on timing of replacing a chemical filter according to claim 1, further comprising:

providing an oscillation circuit including said sensor as a part of oscillating conditions, wherein:

said measurement of said impedance is taken based upon an oscillation frequency or an oscillation amplitude of said oscillation circuit.

3. A method for deciding on timing of replacing a chemical filter according to claim 1, wherein:

said chemical filter is of an activated charcoal fiber type.

4. A filter life detection sensor constituted of a same material as a chemical filter placed in a ventilation path for removing contaminants from air, comprising:

an adsorption state detection sensor through which air containing contaminants flows; and a reference sensor to which a flow of air is blocked.

5. A filter life detection sensor constituted of a same material as a chemical filter placed in a ventilation path for removing contaminants from air, comprising:

an adsorption state detection sensor through which air containing contaminants flows;

a reference sensor; and an air cleaning reference sensor placed in front of said reference sensor.

6. A filter life detection sensor constituted of a same material as a chemical filter placed in a ventilation path for removing contaminants from air, comprising:

a reference sensor; and an adsorption state detection sensor placed in front of said reference sensor.

7. A chemical filter unit, comprising:

a chemical filter for cleaning air;

an adsorption state detection sensor which is constituted of a same material as said chemical filter and through which air containing contaminants flows; and a reference sensor which is constituted of a same material as said chemical filter and to which a flow of air is blocked.

8. A semiconductor manufacturing apparatus, comprising a chemical filter unit, said chemical filter unit comprising:

a chemical filter for cleaning air;

an adsorption state detection sensor which is constituted of a same material as said chemical filter and through which air containing contaminants flows;

a reference sensor which is constituted of a same material as said chemical filter and to which a flow of air is blocked.

* * * * *